(12) United States Patent
Lassalle

(10) Patent No.: US 11,506,262 B2
(45) Date of Patent: Nov. 22, 2022

(54) MECHANICAL REDUCTION GEARING AND ASSOCIATED GEARED MOTOR

(71) Applicant: Valeo Systèmes d'Essuyage, Le Mesnil Saint Denis (FR)

(72) Inventor: Christophe Lassalle, Chatellerault (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 0 days.

(21) Appl. No.: 17/275,073

(22) PCT Filed: Jul. 31, 2019

(86) PCT No.: PCT/EP2019/070668
§ 371 (c)(1),
(2) Date: Mar. 10, 2021

(87) PCT Pub. No.: WO2020/052859
PCT Pub. Date: Mar. 19, 2020

(65) Prior Publication Data
US 2022/0049758 A1 Feb. 17, 2022

(30) Foreign Application Priority Data
Sep. 10, 2018 (FR) ...................................... 1858107

(51) Int. Cl.
F16H 1/32 (2006.01)
F16H 1/46 (2006.01)
F16H 57/08 (2006.01)

(52) U.S. Cl.
CPC ................. F16H 1/46 (2013.01); F16H 1/32 (2013.01); F16H 57/082 (2013.01); F16H 2001/323 (2013.01); F16H 2001/327 (2013.01)

(58) Field of Classification Search
CPC . F16H 1/46; F16H 1/32; F16H 57/082; F16H 2001/327; F16H 2001/323
See application file for complete search history.

(56) References Cited

U.S. PATENT DOCUMENTS 4,348,918 A * 9/1982 Fukui .................... F16H 1/32
475/179
7,056,253 B2 * 6/2006 Tsurumi ................. F16H 1/32
475/162

(Continued)

FOREIGN PATENT DOCUMENTS

CN 1865731 A * 11/2006 ............... F16H 1/32
CN 103742610 A * 4/2014

(Continued)

OTHER PUBLICATIONS

International Search Report and Written Opinion issued in corresponding International Application No. PCT/EP2019/070668, dated Oct. 29, 2019 (10 pages).

*Primary Examiner* — Sherry L Estremsky
(74) *Attorney, Agent, or Firm* — Osha Bergman Watanabe & Burton LLP

(57) ABSTRACT

The present invention relates to a mechanical reduction gearing (1) comprising: —an input shaft (3), —a sun gear (5) coupled in rotation to the input shaft (3), —a planet carrier (7) rotatable with respect to the input shaft (3) and supporting an output shaft (74) coaxial with the input shaft (3), said planet carrier (7) comprising at least one planet shaft (s1, s2, s3) extending parallel to the input shaft (3), —at least one cam (13) arranged around the planet shaft (s1, s2, s3) and comprising a first axial portion (p1) concentric to the planet shaft (s1, s2, s3) and at least one second eccentric axial portion (p2, p3), said at least one planet shaft (s1, s2, s3) being mounted rotatably with respect to the planet carrier (7) and/or said at least one cam (13) being mounted rotatably with respect to the associated planet shaft, —at least one planet gear (15) coupled in rotation to the cam (13) at its first concentric axial portion (p1) and configured to engage with the sun gear (5), —a peripheral annulus (17) arranged concentrically to the input shaft (3) and comprising an inner (Continued)

Figure 1:
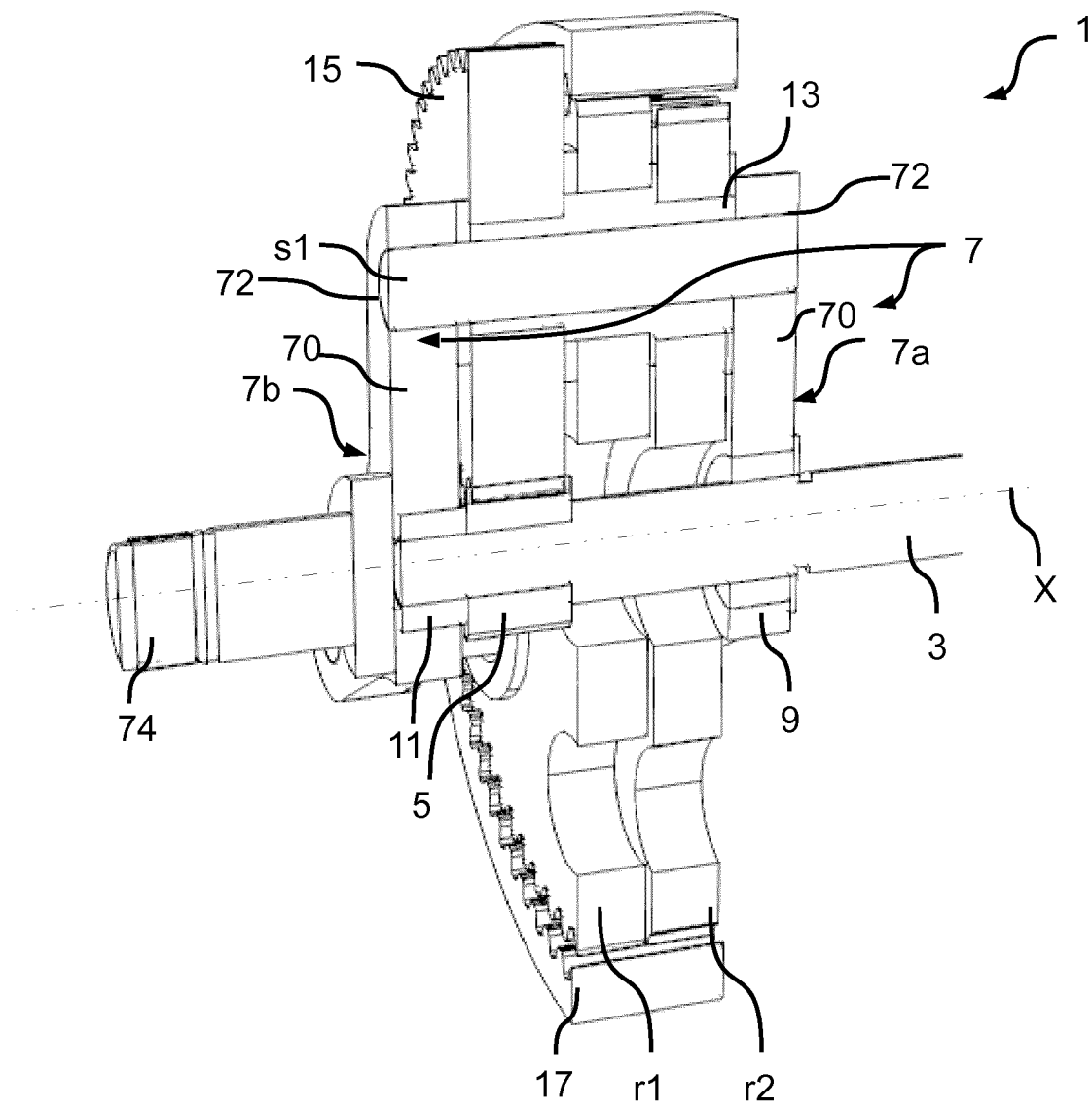

toothing, —at least one toothed wheel (r1, r2) intended to engage with the inner toothing of the peripheral annulus (17) and comprising at least one through-orifice offset with respect to the centre of the toothed wheel (r1, r2) and configured to cooperate with the second axial portion (p2, p3) of the cam (13) such that the rotation of the cam (13) causes the toothed wheel (r1, r2) to roll against the peripheral annulus (17), said rolling movement of the toothed wheel (r1, r2) being accompanied by the rotation of the planet carrier (7) with respect to the input shaft (3), and wherein the toothings of the peripheral annulus (17) and of the at least one toothed wheel (r1, r2) are toothings in the form of an involute to a circle.

10 Claims, 4 Drawing Sheets

(56) References Cited

U.S. PATENT DOCUMENTS

| | | | | |
|---|---|---|---|---|
| 9,657,813 | B2 * | 5/2017 | Tesar | F16H 57/08 |
| 9,879,760 | B2 * | 1/2018 | Tesar | F16H 1/32 |
| 10,161,480 | B2 * | 12/2018 | Hsieh | F16H 1/32 |

FOREIGN PATENT DOCUMENTS

| | | | | |
|---|---|---|---|---|
| EP | 1798444 A1 | 6/2007 | | |
| EP | 1985891 A1 | 10/2008 | | |
| FR | 2570155 A1 | 3/1986 | | |
| GB | 927684 A | * | 6/1963 | |
| JP | 2017214941 A | * | 12/2017 | |
| WO | WO-2007135705 A1 | * | 11/2007 | F16H 1/32 |
| WO | WO-2017008873 A1 | * | 1/2017 | F16C 33/585 |

* cited by examiner

MECHANICAL REDUCTION GEARING AND ASSOCIATED GEARED MOTOR

The present invention relates to the field of mechanical reduction gearing or reduction gears used in particular at the output of an electric motor to form a geared motor, for example in motor vehicle wiper systems.

Reduction gears are used in particular to reduce a rotation speed and obtain a high turning transmission torque.

Different types of reduction gearing are known in the prior art. The selection of a type of reduction gearing is generally linked to the various constraints associated with the application in which the reduction gearing is used.

In the case of a geared motor suitable for being provided on a motor vehicle, a major constraint can be the small footprint, in particular the small diameter, required for the geared motor to be installed easily in the motor vehicle. In the case of a brushless electric motor having a reduced length, it can be beneficial to position a reduction gearing in line with the motor, the diameter of which is not greater than that of the motor while obtaining the desired reduction ratio. In the case of wiper systems, this ratio is normally in the region of 1:70.

In order to obtain a high reduction ratio in a small space, the use of a trochoidal mechanical reduction gearing is known. However, these reduction gearings have several drawbacks, particularly in that the profile of the eccentric gear configured to roll on the outer rollers must be defined specifically for each roller and eccentric gear dimension, which makes production complex and costly, as well as in that it is difficult to transmit the output torque due to the planetary rotation of the eccentric gear (which does not therefore rotate about a fixed axis).

In order to at least partially overcome these drawbacks of the prior art, the present invention aims to provide a mechanical reduction gearing having a high reduction ratio for a small footprint while allowing efficient transmission of the output torque and the production cost of which is limited.

To this end, the present invention relates to a mechanical reduction gearing comprising:
- an input shaft,
- a sun gear rotatably coupled to the input shaft,
- a planet carrier capable of rotating relative to the input shaft and supporting an output shaft coaxial with the input shaft, said planet carrier comprising at least one planet shaft extending parallel to the input shaft,
- at least one cam positioned around the planet shaft and comprising a first axial portion concentric with the planet shaft and at least a second axial portion that is eccentric, said at least one planet shaft being rotatably mounted relative to the planet carrier and/or said at least one cam being rotatably mounted relative to the associated planet shaft,
- at least one planet gear rotatably coupled to the cam on its concentric first axial portion and configured to mesh with the sun gear,
- a peripheral ring gear positioned concentrically with the input shaft and comprising internal teeth,
- at least one toothed wheel suitable for meshing with the internal teeth of the peripheral ring gear and comprising at least one through-orifice offset relative to the center of the toothed wheel and configured to interact with the second axial portion of the cam so that the rotation of the cam causes the toothed wheel to mesh positively with, and therefore roll against, the peripheral ring gear, said meshing of the toothed wheel also resulting in the rotation of the planet carrier relative to the input shaft, and in which the teeth of the peripheral ring gear and of the at least one toothed wheel are involute teeth as known in the field of gears.

According to one aspect of the present invention, the mechanical reduction gearing comprises two toothed wheels and the cam comprises two eccentric second axial portions respectively associated with the two toothed wheels and the eccentricities of which are positioned diametrically opposite each other relative to the planet shaft.

According to one aspect of the present invention, the difference in the number of teeth between the peripheral ring gear and the at least one toothed wheel is at least three teeth.

According to one aspect of the present invention, the peripheral ring gear comprises 68 teeth and the at least one toothed wheel comprises 65 teeth.

According to one aspect of the present invention, the planet carrier comprises three planet shafts configured to receive three cams and three planet gears respectively.

According to one aspect of the present invention, the sun gear comprises 15 teeth and the at least one planet gear comprises 45 teeth.

According to one aspect of the present invention, the planet carrier comprises a first part positioned axially on a first side of the at least one toothed wheel and of the planet gear and a second part positioned axially on the second side of the at least one toothed wheel and of the sun gear, the first and second parts being connected to each other by the at least one planet shaft.

According to one aspect of the present invention, the first and second parts of the planet carrier are rotatably mounted relative to the input shaft via first and second rotational guide means respectively. Preferably, the type of each of these rotational guide means is selected between a plain bearing and a mechanical rolling bearing. In a particular embodiment, said first and second rotational guide means are respectively a mechanical rolling bearing and a plain bearing.

The present invention also relates to a geared motor comprising:
- a mechanical reduction gearing as described above,
- an electric motor configured to rotate the input shaft of the mechanical reduction gearing.

According to one aspect of the present invention, the electric motor is a brushless electric motor.

Figure 2:
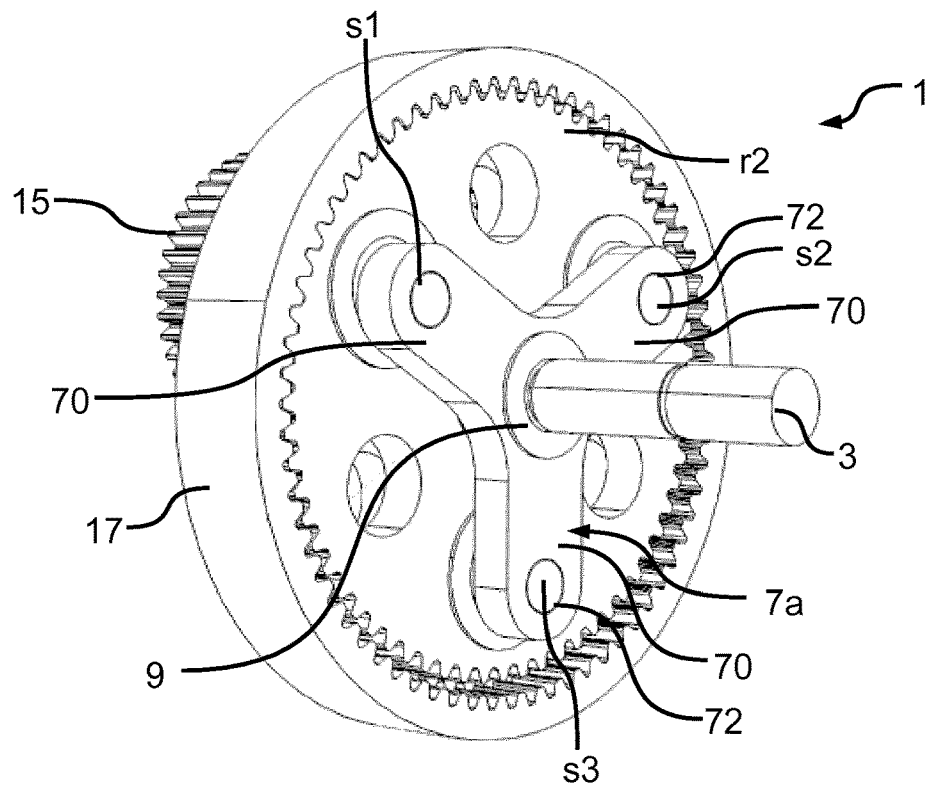
Figure 3:
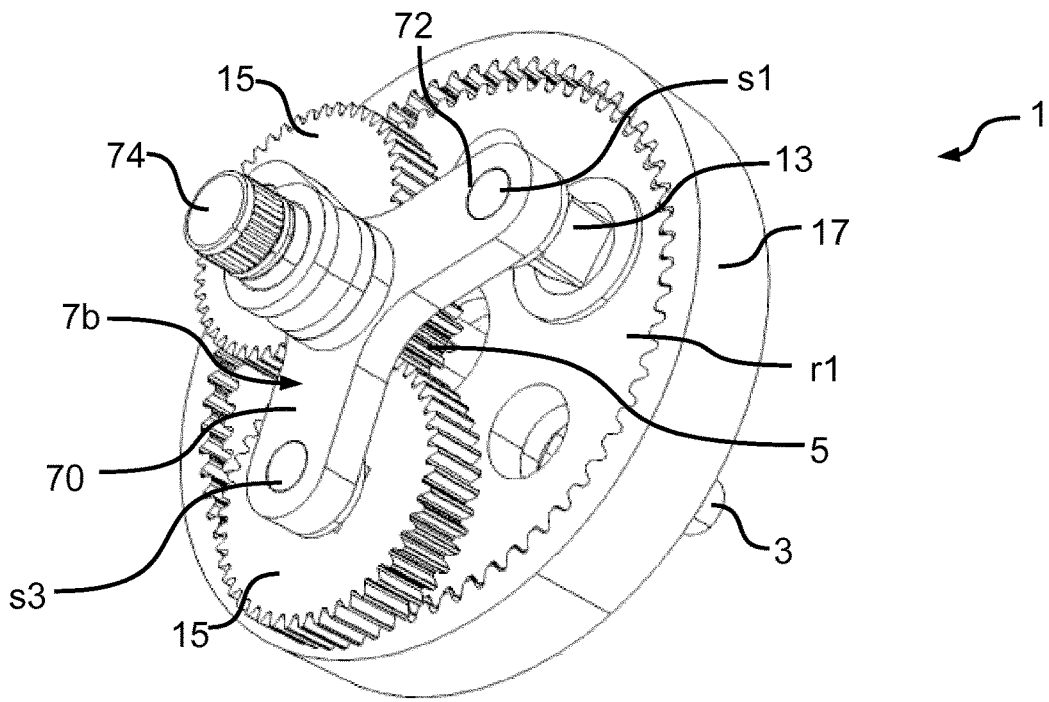
Figure 4:
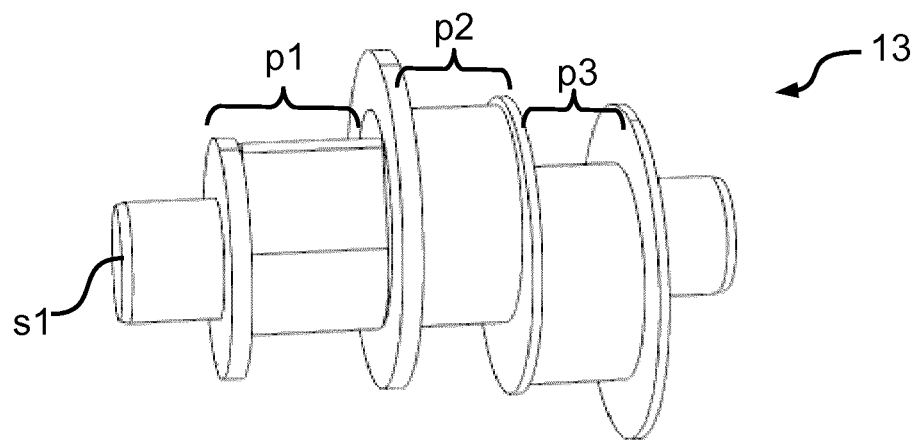
Figure 5:
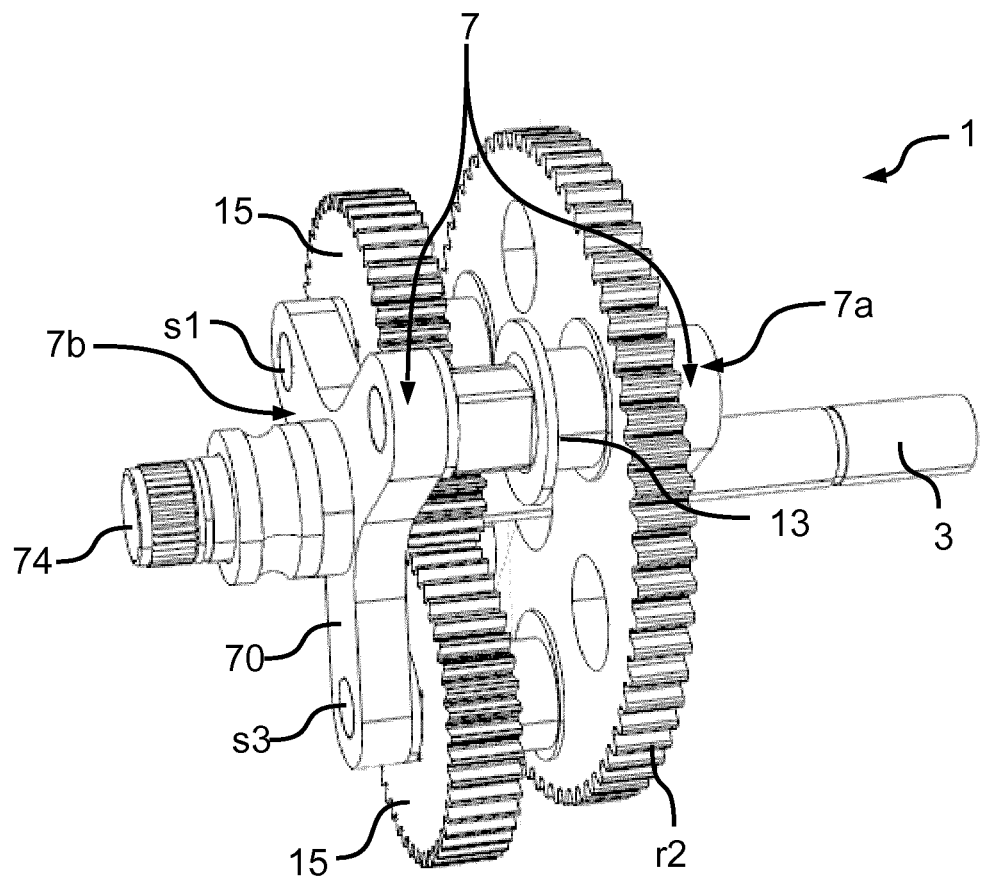
Figure 6:
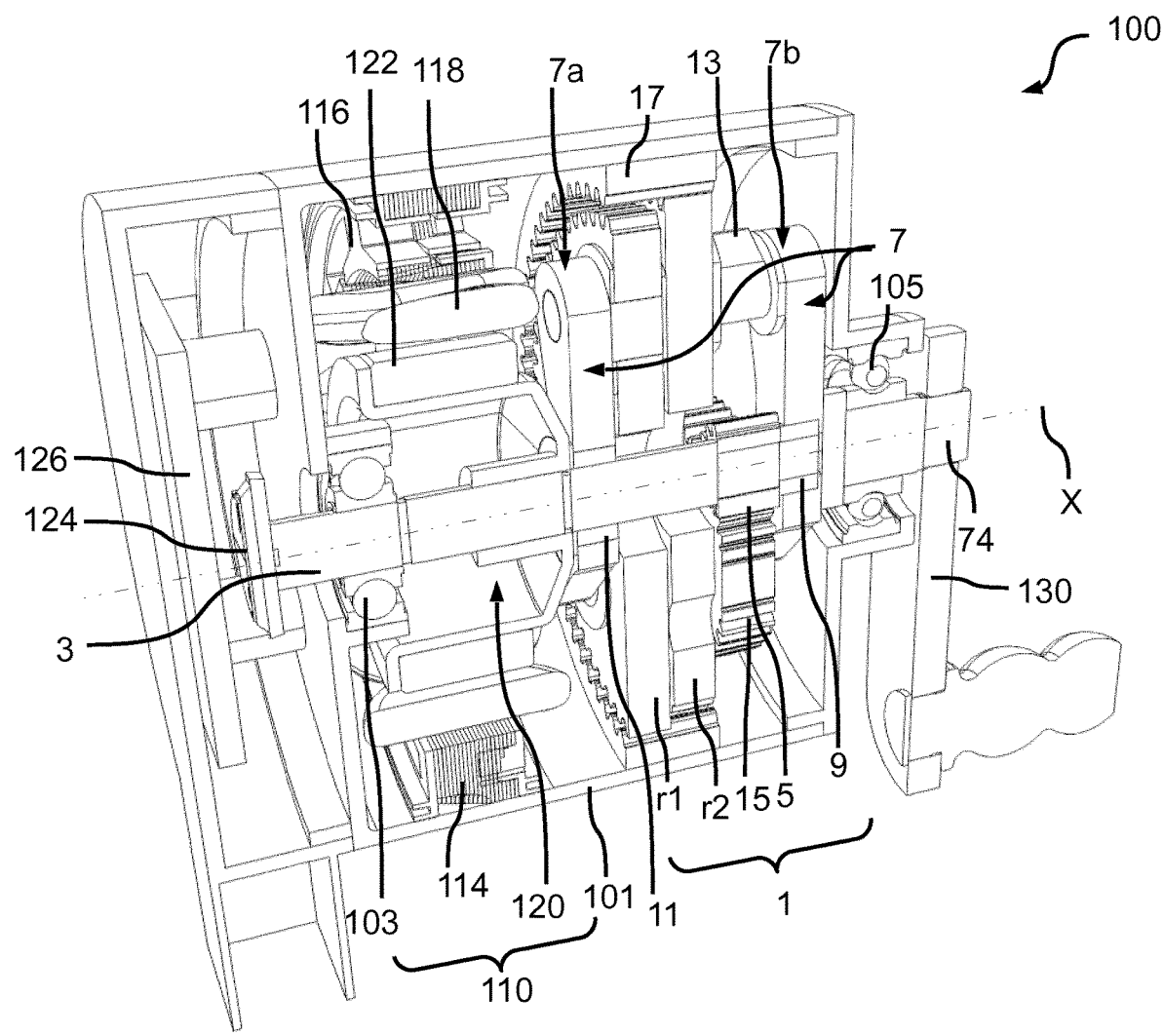

Further features and advantages of the invention will become apparent from the following description, given by way of non-limiting example, with reference to the attached drawings, in which:

FIG. 1 shows a perspective cross-sectional schematic view of a mechanical reduction gearing according to one embodiment of the present invention, FIG. 2 shows a perspective schematic view of a first side of a reduction gearing according to one embodiment of the present invention, FIG. 3 shows a perspective schematic view of a second side of a reduction gearing according to one embodiment of the present invention, FIG. 4 shows a perspective schematic view of a cam, FIG. 5 shows a perspective schematic view of a part of a reduction gearing according to one embodiment of the present invention, FIG. 6 shows a perspective cross-sectional view of a geared motor according to one embodiment of the present invention.

In all of the figures, identical elements have the same reference numbers.

The following embodiments are examples. Although the description refers to one or more embodiments, this does not necessarily mean that each reference relates to the same embodiment or that the features only apply to a single embodiment. Single features of different embodiments can also be combined or interchanged to provide other embodiments.

In the following description, certain elements or parameters can be given ordinal numbers such as, for example, first element or second element, etc. In this case, the ordinal numbering is simply to differentiate between and denote elements that are similar but not identical, and such numbering can easily be interchanged without departing from the scope of the present description. Likewise, this ordinal numbering does not imply any chronological order when considering any given criterion.

FIG. 1 shows a cross-sectional view of a part of a mechanical reduction gearing 1 according to one embodiment of the present invention.

The mechanical reduction gearing 1 comprises an input shaft 3 or primary shaft configured to extend along an axis X corresponding to the axis of the mechanical reduction gearing 1. A sun gear 5 is configured to be rotatably coupled to the input shaft 3 about the axis X.

The reduction gear 1 also comprises a planet carrier 7 configured so that it can rotate relative to the input shaft 3 about the axis X.

The planet carrier 7 comprises, for example, a first part 7a positioned around the input shaft 3 via first rotational guide means, in this case the plain bearing 9, and a second part 7b positioned around the input shaft 3 via second rotational guide means, in this case the rolling bearing 11. However, other types and configurations of the guide means can obviously be envisaged. FIG. 2 shows a perspective view of the mechanical reduction gearing 1 from the side of the first part 7a of the planet carrier 7, and FIG. 3 shows a perspective view of the mechanical reduction gearing 1 from the side of the second part 7b of the planet carrier 7.

The first and second parts 7a and 7b each comprise, for example, three evenly distributed arms 70 that extend in a star shape around a central part. The different arms 70 of each of the first and second parts 7a and 7b extend for example at 120° to each other.

Each arm 70 comprises an axial opening 72, which can be a through-opening, and which is configured to receive an end of a shaft. The axial openings 72 are for example situated near the end of the arms 70 and are intended to be positioned equidistant from the axis X in the assembled state of the mechanical reduction gearing 1. The planet carrier 7 also comprises three planet shafts denoted s1, s2 and s3 that extend between the first part 7a and the second part 7b. More specifically, the planet shafts s1, s2 and s3 extend respectively between an axial opening 72 in one arm 70 of the first part 7a and an axial opening 72 in one arm of the second part 7b so that the three planet shafts s1, s2 and s3 extend parallel to the axis X and are situated equidistant from the axis X. The planet shafts s1, s2 and s3 can be rotatably mounted relative to the planet carrier 7.

The second part 7b also comprises an output shaft 74 coaxial with the input shaft 3 that extends axially from the central part of the second part 7b. The output shaft 74 is for example integrally formed with the second part 7b of the planet carrier 7.

The mechanical reduction gearing 1 also comprises three cams 13 configured so that they are positioned respectively around the three planet shafts s1, s2 and s3.

The cams 13 can be rotatably coupled to the respective planet shafts (in this case, the cams 13 can be integrally formed with the respective planet shafts s1, s2, s3) if the planet shafts s1, s2, s3 are capable of rotating relative to the arms 70 or can be capable of rotating relative to the planet shafts s1, s2, s3 (in this case, the planet shafts s1, s2, s3 can be fixed relative to the planet carrier 7).

As shown in FIG. 4, the cams 13 comprise a first axial portion denoted p1 intended to be concentric with the associated planet shaft s1, s2 or s3 in the assembled state of the mechanical reduction gearing 1 and configured to receive a planet gear 15 (two of the three planet gears 15 are shown in FIG. 5). The planet gears 15 are rotatably coupled to the associated cam 13. The rotatable coupling is for example achieved through the use of a non-circular profile on the axial portion p1 and a shape that complements the profile of the axial portion p1 on the planet gear 15. The planet gears 15 are configured to mesh with the sun gear 5 in the assembled state of the mechanical reduction gearing 1.

The cams 13 also comprise a second axial portion p2 and a third axial portion p3 configured to be eccentric relative to the associated planet shaft s1, s2 or s3 in the assembled state of the mechanical reduction gearing 1. The second and third axial portions p2 and p3 are for example cylindrical. The eccentricity of the second axial portion p2 is identical to the eccentricity of the third axial portion p3 but their eccentricities are oriented in opposite directions, that is, the axis of rotation of the cam 13 (corresponding to the planet shaft s1, s2 or s3) is situated in the center of the segment connecting the center of the cylinders of the second axial part p2 and of the third axial part p3.

The mechanical reduction gearing 1 also comprises a peripheral ring gear 17 comprising internal teeth and intended to be positioned around the second p2 and third p3 axial portions of the cams 13 and concentrically with the axis X in the assembled state of the mechanical reduction gearing 1.

The mechanical reduction gearing 1 also comprises a first r1 and a second r2 toothed wheel (visible in particular in FIG. 1). The first and second toothed wheels r1 and r2 are identical and have a diameter smaller than the inner diameter of the peripheral ring gear 17.

The first toothed wheel r1 comprises three circular through-holes that are eccentric (relative to the center of the toothed wheel r1) and extend parallel to the axis X. The through-holes in the first toothed wheel r1 are configured to receive the second axial portions p2 of the three cams 13 respectively.

The second toothed wheel r2 also comprises three circular through-holes that are eccentric (relative to the center of the toothed wheel r2) and extend parallel to the axis X. The through-holes in the second toothed wheel r2 are configured to receive the third axial portions p3 of the three cams 13 respectively.

In addition, the first and second toothed wheels r1 and r2 are configured to mesh with the internal teeth of the peripheral ring gear 17.

The first and second toothed wheels r1 and r2 also comprise a central axial through-hole configured to allow the passage of the input shaft 3 and the eccentric rotation of the toothed wheels r1, r2 around the input shaft 3.

The cams 13 are thus configured to interact with the toothed wheels r1 and r2 so that the rotation of the cams 13 causes the positive meshing of the toothed wheels r1 and r2 with the peripheral ring gear 17.

In order to allow satisfactory transmission of the torque and a production method that can be adapted to different configurations of the mechanical reduction gearing 1, the teeth of the first and second toothed wheels r1 and r2 and the teeth of the peripheral ring gear 17 are standard involute teeth. Such teeth make it possible to limit losses due to the absence of sliding between the parts, and to transmit high torque while limiting the wear of the parts. In addition, these teeth do not make it necessary to recalculate a specific profile if the toothed wheels r1, r2 are used with a peripheral ring gear 17 of a different size, or if the peripheral ring gear 17 is used with toothed wheels r1, r2 of different sizes.

FIG. 5 shows the assembly comprising the input shaft 3, the planet carrier 7, the cams 13, the sun gear 5, two of the three planet gears 15 and one of the two toothed wheels (r2 in this case) in the assembled position.

Reduction Ratio

The reduction ratio of the mechanical reduction gearing 1 is given by the formula:

$$1 + \frac{Z_2}{Z_1} \times \left(\frac{Z_4}{Z_4 - Z_3}\right)$$

where $Z_1$ is the number of teeth of the sun gear 5, $Z_2$ is the number of teeth of the planet gears 15, $Z_3$ is the number of teeth of the toothed wheels r1 and r2 and $Z_4$ is the number of teeth of the peripheral ring gear 17.

So as to facilitate the assembly of the reduction gearing, the number of teeth of the sun gear 5 and of the planet gears 15 is preferably a multiple of the number of planet gears 15, that is, a multiple of three in this case.

In addition, to allow optimum balancing of masses, the number of toothed wheels r1, r2 is at least two, with a number of teeth of the ring gear 17 that is a multiple of this number of toothed wheels r1, r2, that is, a multiple of two in this case.

In addition, the difference in the number of teeth between the toothed wheels r1 and r2 and the peripheral ring gear 17 is selected so that it is at least three teeth, for example between three and five teeth, in particular three teeth, to limit the stresses on the teeth of the peripheral ring gear 17 and of the toothed wheels r1 and r2.

In order to obtain a reduction ratio of 69, it is thus possible to select a sun gear 5 comprising 15 teeth, planet gears 15 comprising 45 teeth, toothed wheels comprising 65 teeth and a ring gear 17 comprising 68 teeth.

Operation

In operation, the rotation of the input shaft 3 about the axis X results in the rotation of the sun gear 5, which then rotates the three planet gears 15. As the planet gears 15 are rotatably coupled to the cams 13 respectively, the cams are rotated about the respective planet shafts s1, s2 and s3. The rotation of the cams 13 around the planet shafts s1, s2 and s3 causes the positive meshing of the first and second toothed wheels r1 and r2 with the ring gear 17. In the assembled state of the mechanical reduction gearing 1, the first toothed wheel r1 is positioned diametrically opposite the second toothed wheel r2, which makes it possible to obtain balanced moving masses and reduce the vibrations (particularly compared with a mechanical reduction gearing 1 comprising a single toothed wheel).

The rotation of the first and second toothed wheels r1 and r2 on the peripheral ring gear 17 also results in the rotation of the assembly comprising the cams 13, the planet shafts s1, s2 and s3 and the planet carrier 7 about the axis X. As the output shaft 74 is positioned on the planet carrier 7, the rotation of the output shaft 74 is thus obtained with a reduction ratio as described above between the rotation speed of the input shaft 3 and the rotation speed of the output shaft 74. The mechanical reduction gearing 1 therefore comprises a trochoidal reduction gearing formed in particular by the toothed wheels r1 and r2, the peripheral ring gear 17, the planet carrier 7 and the cams 13 making it possible to obtain a high reduction ratio in a small space, to which is coupled a planetary stage formed in particular by the sun gear 5, the planet gears 15 and the planet carrier 7 that makes it possible to obtain centered, guided rotation of the output shaft 74.

The present invention is not limited to the embodiment described above and shown in the figures, but also extends to embodiments comprising a number of planet gears 15 different from three, a number of toothed wheels r1, r2 different from two, and gears 5, 15, toothed wheels r1, r2 or a peripheral ring gear 17 with a different number of teeth.

The present invention also relates to a geared motor 100 comprising a mechanical reduction gearing 1 as described above, the input shaft 3 of which is configured to be driven by an electric motor.

FIG. 6 shows a perspective cross-sectional view of an embodiment of such a geared motor 100. The geared motor 100 can comprise a protective casing 101. The protective casing 101 can be cylindrical. The geared motor 100 can comprise a first bearing 103 for guiding the input shaft 3 and a second bearing 105 for guiding the output shaft 74. The first 103 and second 105 bearings can be formed by rolling bearings, for example ball bearings. The bearings 103, 105 can be positioned in dedicated recesses in the protective casing 101. The ring gear 17 can also be fixed to the protective casing 101.

The geared motor 100 therefore comprises an electric motor 110 configure to rotate the input shaft 3. The electric motor 110 comprises a stator 112 that can be fixed to the protective casing 101. The stator 112 comprises, for example, a stator plate 114 comprising arms 116 suitable for receiving stator windings to form coils 118 (shown schematically in FIG. 6).

The electric motor 110 also comprises a rotor 120 rotatably coupled to the input shaft 3 and comprising, for example, permanent magnets 122 (or alternatively coils or electromagnets) suitable for interacting with the coils 118, the powering of these coils 118 causing the interaction with the permanent magnets 122 and the rotation of the rotor 120.

The electric motor 110 can also comprise a control magnet 124 rotatably coupled to the input shaft 3, and a position sensor, for example a Hall effect sensor, configured to determine the position of the control magnet 124 and therefore the angular position of the input shaft 3. The control magnet 124 can be positioned at the end of the input shaft 3 and the sensor can be positioned on a printed circuit board 126 positioned facing the control magnet 124.

A crank 130 can be mounted on the output shaft 74 of the mechanical reduction gearing 1 to transmit the turning torque from the output shaft 74 to a linkage of a wiper device of a motor vehicle.

The electric motor 110 and the mechanical reduction gearing 1 can therefore be positioned in a single protective casing 101 the diameter of which corresponds to the diameter of the electric motor 110, for example, a diameter less than 100 mm, particularly between 80 mm and 90 mm. By using a brushless electric motor 110 the axial length of which is reduced, a geared motor 100 is obtained the footprint of which is limited and that can therefore easily be installed in a motor vehicle, particularly to drive a wiper device.

The invention claimed is:

1. A mechanical reduction gearing comprising:
   an input shaft;
   a sun gear rotatably coupled to the input shaft;
   a planet carrier capable of rotating relative to the input shaft and supporting an output shaft coaxial with the input shaft, said planet carrier comprising at least one planet shaft extending parallel to the input shaft; and
   at least one cam positioned around the planet shaft and comprising a first axial portion concentric with the planet shaft and two second axial portions that are eccentric,
   said at least one planet shaft being rotatably mounted relative to the planet carrier and said at least one cam being rotatably mounted relative to the associated planet shaft;
   at least one planet gear, which is distinct from the first axial portion, rotatably coupled to the cam on its concentric first axial portion and configured to mesh with the sun gear;
   a peripheral ring gear positioned concentrically with the input shaft and comprising internal teeth; and
   at least one toothed wheel for meshing with the internal teeth of the peripheral ring gear and comprising at least one through-orifice offset relative to the center of the toothed wheel and configured to interact with the two second axial portions of the cam so that the rotation of the cam causes the toothed wheel to mesh positively with the peripheral ring gear, said meshing of the toothed wheel also resulting in the rotation of the planet carrier relative to the input shaft, and
   wherein the teeth of the peripheral ring gear and of the at least one toothed wheel are involute teeth,
   wherein the eccentricities of the two second axial portions are oriented in opposite directions.

2. The mechanical reduction gearing as claimed in claim 1, comprising two toothed wheels and in which the cam comprises the two eccentric second axial portions respectively associated with the two toothed wheels, wherein the eccentricities of the two eccentric second axial portions are positioned diametrically opposite each other relative to the planet shaft.

3. The mechanical reduction gearing as claimed in claim 1, in which the difference in the number of teeth between the peripheral ring gear and the at least one toothed wheel is at least three teeth.

4. The mechanical reduction gearing as claimed in claim 3, in which the peripheral ring gear comprises 68 teeth and the at least one toothed wheel comprises 65 teeth.

5. The mechanical reduction gearing as claimed in claim 1, in which the planet carrier comprises three planet shafts configured to receive three cams and three planet gears respectively.

6. The mechanical reduction gearing as claimed in claim 1, in which the sun gear comprises 15 teeth and the at least one planet gear comprises 45 teeth.

7. The mechanical reduction gearing as claimed in claim 1, in which the planet carrier comprises a first part positioned axially on a first side of the at least one toothed wheel and of the planet gear and a second part positioned axially on the second side of the at least one toothed wheel and of the sun gear, the first and second parts being connected to each other by the at least one planet shaft.

8. The mechanical reduction gearing as claimed in claim 7, in which the first and second parts of the planet carrier are rotatably mounted relative to the input shaft via first and second rotational guide means comprising a plain bearing and a mechanical rolling bearing.

9. A geared motor comprising:
   a mechanical reduction gearing as claimed in claim 1; and
   an electric motor configured to rotate the input shaft of the mechanical reduction gearing.

10. The geared motor as claimed in claim 9, in which the electric motor is a brushless electric motor.

\* \* \* \* \*